United States Patent
Richards et al.

(10) Patent No.: US 10,511,628 B1
(45) Date of Patent: Dec. 17, 2019

(54) DETECTING REALTIME PHISHING FROM A PHISHED CLIENT OR AT A SECURITY SERVER

(71) Applicant: Lookout, Inc., San Francisco, CA (US)

(72) Inventors: Jeremy Boyd Richards, Ontario (CA); Brian James Buck, Livermore, CA (US)

(73) Assignee: LOOKOUT, INC., San Francisco, CA (US)

( * ) Notice: Subject to any disclaimer, the term of this patent is extended or adjusted under 35 U.S.C. 154(b) by 0 days.

(21) Appl. No.: 16/295,974

(22) Filed: Mar. 7, 2019

(51) Int. Cl.
*H04L 29/06* (2006.01)
*G06F 16/958* (2019.01)
*G06F 16/955* (2019.01)
*H04L 29/08* (2006.01)

(52) U.S. Cl.
CPC ...... *H04L 63/1483* (2013.01); *G06F 16/9566* (2019.01); *G06F 16/986* (2019.01); *H04L 63/14* (2013.01); *H04L 67/02* (2013.01)

(58) Field of Classification Search
CPC ...... G06F 21/128; G06F 21/50; G06F 21/554; G06F 21/56; H04L 63/14; H04L 63/1466; H04L 63/1483; H04L 63/1441; H04L 63/1416
See application file for complete search history.

(56) References Cited

U.S. PATENT DOCUMENTS

| 8,578,499 | B1 * | 11/2013 | Zhu | G06F 21/567 |
| | | | | 713/154 |
| 2011/0072262 | A1 * | 3/2011 | Amir | G06F 21/52 |
| | | | | 713/168 |
| 2012/0198528 | A1 * | 8/2012 | Baumhof | G06F 21/56 |
| | | | | 726/6 |
| 2016/0285861 | A1 * | 9/2016 | Chester | H04L 9/14 |

* cited by examiner

*Primary Examiner* — Edward Zee
(74) *Attorney, Agent, or Firm* — Greenberg Traurig, LLP

(57) ABSTRACT

Disclosed herein are techniques for detecting phishing websites. In one embodiment, a method is disclosed comprising receiving, at a server, a request for a webpage from a client device; generating, by the server, and inserting an encoded tracking value (ETV) into the webpage; inserting, by the server, dynamic tracking code (DTC) into the webpage, the inserting of the DTC further comprising obfuscating the DTC; and returning, by the server, the webpage including the ETV and DTC to the client device, the DTC configured to execute upon receipt at the client device and validate the ETV upon executing.

17 Claims, 5 Drawing Sheets

DETECTING REALTIME PHISHING FROM A PHISHED CLIENT OR AT A SECURITY SERVER

COPYRIGHT NOTICE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments are directed toward the field of computer security and, specifically, to devices, methods, and computer-readable media for detecting phishing attempts executing or executed on server applications.

Due to the anonymous (or pseudo-anonymous) nature of the Internet, and World Wide Web, it is incumbent on users (and tools used by users) to verify the identity of entities such users interact with via anonymous networks. Malicious attackers frequently exploit both the anonymous nature of network transport protocols and users' inexperience to create clones of websites. For example, an attacker may copy the website of "www.retailer.com" and host their own, controlled copy at "www.retailer.com," purporting to be owned by "www.retailer.com" and aiming to obtain personal of financial information of the users.

Currently, the use of public-key cryptography is used to verify the identity of websites. When a user visits a website, a browser displays an icon or other indicia indicating that the website is operated by a trusted entity. However, this approach requires that users understand the purpose of public-key cryptography and understand what a certificate represents. Additionally, users must educate themselves to identify verified certificates. Additionally, while improving, public-key cryptography certificates can be cumbersome for website operators to obtain and manage, thus many sites eschew relying on such certificates.

As a result, there exists a need for techniques for verifying the authenticity of a website that is both difficult to detect by attackers and globally accessible by all websites.

BRIEF SUMMARY

The disclosed embodiments describe systems and methods for detecting the existence of a phished website. Currently, attackers clone websites and serve the clones of such websites on hardware controlled by the attackers. These attackers may clone a portion of all of a target website. As used herein, cloning refers to the copying of the Hypertext Markup Language (HTML) code and any assets (e.g., JavaScript, Cascading Style Sheets (CSS), images, fonts, etc.) referenced by the HTML code. The ultimate goal of the attacker is to fool users into believing the cloned site is the original site. The embodiments disclosed more fully herein provide mechanisms for modifying the traditional delivery of webpages (and web applications) in order to detect phishing attempts. As used herein, detecting phishing attempts refers to detecting that an attacker cloning a website (or part thereof) as well as detecting that an end user is access (perhaps, unwittingly) a cloned website. In brief, the disclosed embodiments insert a unique, encoded value and a script for accessing the value within the webpages served by a web server. This value and script are used to validate the authenticity of a website and thus detect inauthentic, phishing sites. Further, disclosed are multiple techniques for hiding both the value and script in order to prevent detection by attackers and/or automated tools.

In one embodiment, a method is disclosed comprising receiving, at a server, a request for a webpage from a client device; generating, by the server, and inserting an encoded tracking value (ETV) into the webpage; inserting, by the server, dynamic tracking code (DTC) into the webpage, the inserting of the DTC further comprising obfuscating the DTC; and returning, by the server, the webpage including the ETV and DTC to the client device, the DTC configured to execute upon receipt at the client device and validate the ETV upon executing.

In another embodiment, a non-transitory computer readable storage medium for tangibly storing computer program instructions capable of being executed by a computer processor executing on a server is disclosed, the computer program instructions defining the steps of: receiving a request for a webpage from a client device; generating and inserting an encoded tracking value (ETV) into the webpage; inserting dynamic tracking code (DTC) into the webpage, the inserting of the DTC further comprising obfuscating the DTC; and returning the webpage including the ETV and DTC to the client device, the DTC configured to execute upon receipt at the client device and validate the ETV upon executing.

In another embodiment, a server is disclosed comprising a processor; a storage medium for tangibly storing thereon program logic for execution by the processor, the stored program logic comprising logic performing the steps of: receiving a request for a webpage from a client device, generating and inserting an encoded tracking value (ETV) into the webpage, inserting dynamic tracking code (DTC) into the webpage, the inserting of the DTC further comprising obfuscating the DTC, and returning the webpage including the ETV and DTC to the client device, the DTC configured to execute upon receipt at the client device and validate the ETV upon executing.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
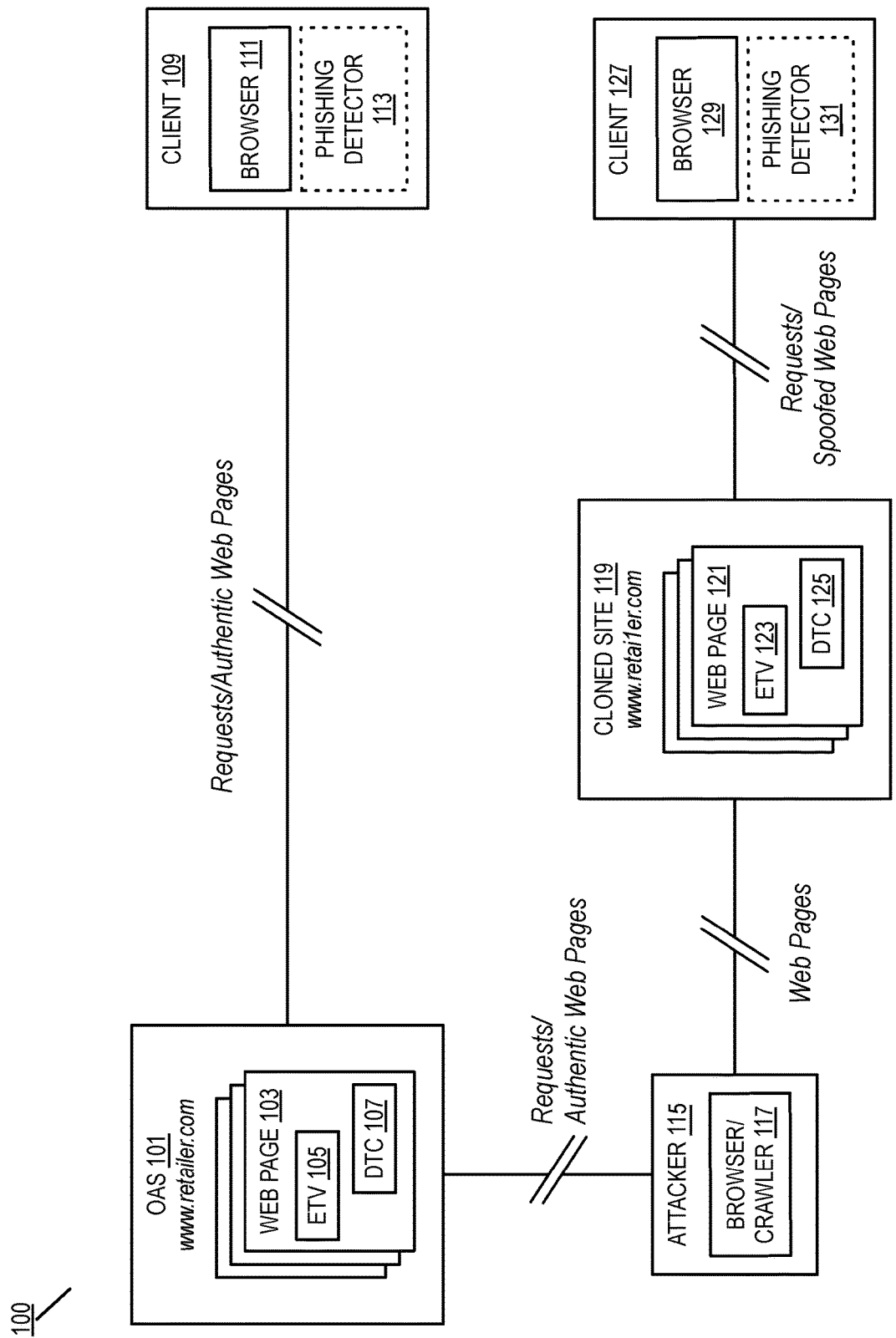
FIG. 1 is a block diagram illustrating a system for preventing phishing of authentic websites according to some embodiments of the disclosure.

FIG. 1 is a block diagram illustrating a system for preventing phishing of authentic websites according to some embodiments of the disclosure.

In the system (100) an original, authentic site (OAS) (101) serves one or more web pages, such as web page (103) to client devices such as client device (109). The illustrated embodiment places no limitation on the architecture of the OAS (101). In one embodiment, the OAS (101) comprises a web server (or group of web servers behind a load balancer) that is configured to process HTTP requests from client devices. Alternatively, or in conjunction with the foregoing, OAS (101) may comprise a virtualized server or containerized server executing on a cloud platform.

In the illustrated embodiment, the OAS (101) serves a web page (103). In one embodiment, a web page (103) can comprise a static web page. Alternatively, or in conjunction with the foregoing, the web page (103) is generated programmatically by the OAS (101). The specific content of the web page (103) is not intended to limit the disclosure, nor is the specific way (with the exception of the ETV and DTC, discussed infra) in which the web page is constructed. In some embodiments, the web page (103) is constructed by receiving an HTTP request, triggering a function or route, loading data from a database (not illustrated), and filling a template with the data.

In one embodiment, the OAS (101) can determine that the HTTP request is from a particular type of client (e.g., a safe, unknown, or malicious client). In some embodiments, the OAS (101) stores a database mapping IP addresses (or domain names, or other identifying indicia) to a client classification. Then, the OAS (101) can classify the sender of a request using the mapping and an IP address or the domain name associated with the request. In some embodiments where the IP address or domain name is not known (e.g., not previously identified as safe) then it is marked as unknown. In some embodiments, the methods may use the processes described herein to classify domain names and/or IP addresses as safe or malicious as the system transmits data to the tracking server or OAS (101). For example, as will be described below, the tracking code embedded within a served web page may transmit the IP address of the requesting client to the tracking server. As part of this transmission, the tracking code can classify the client as a viewer of a potentially spoofed web page. This labeling can then be used (along with a classification as an attacked described in FIG. 5) to classify an IP address or current domain name as malicious or safe, depending on the output of the tracking code. In some embodiments, the OAS (101) can use the classification of IP address/domain name to block all responses to requests made by malicious clients.

As part of the above processes, the OAS (101) includes an encoded tracking value (ETV) (105) and dynamic tracking code (DTC) (107) into a given web page (103). The ETV (105) and DTC (107) are dynamically inserted into the web page (103), regardless of whether web page (103) is a static file or dynamically generated. Specific techniques for inserting the ETV (105) and DTC (107) into the web page (103) are described further herein.

In the illustrated embodiment, a client device (109) receives the web page (103) in response to a request (e.g., HTTP request). In the illustrated embodiment, the client device (109) executes a web browser (111) or similar software for processing HTTP responses (e.g., a WebView component in a mobile application). In general, browser (109) is capable of rendering de jure and de facto standard resources (e.g., HTML, JavaScript, CSS, etc.).

In one embodiment, the client device (109) includes a phishing detector (113). In one embodiment, phishing detector (113) is executed by the browser. In this embodiment, the phishing detector (113) comprises the DTC (107) executed by the browser (e.g., as JavaScript). Alternatively, the phishing detector (113) may comprise a separate application operable to monitor web pages and other content received by the client device (109). For example, the phishing detector (113) may comprise a software application installed to sniff HTTP traffic and process web pages in a manner similar to that of the executing DTC (107).

Additionally, illustrated in system (100) is an attacker (115). In the illustrated embodiment, an attacker (115) comprises hardware controlled by a malicious entity (e.g., a server, desktop, etc.). In general, the attacker (115) executes a browser or, more likely, a crawler (117). A crawler (117) automatically retrieves web pages from a domain operated by OAS (101). In one embodiment, the crawler (117) is configured to download and store all assets served by the OAS (101) as well as all assets referenced by web pages of the OAS (101) (e.g., third-party images, CSS, JavaScript etc.). In essence, crawler (117) is configured to "clone" all resources of a web site provided by OAS (101).

The attacker (115) uploads all of the content retrieved by crawler (117) to a cloned site (119). As with OAS (101), cloned site (119) comprises a server or set of servers configured to receive and respond to network requests (e.g., HTTP requests). Cloned site (119) performs many of the same functions as OAS (101) described previously. However, cloned site (119) operates significantly different in many respects, which are described herein.

Since cloned site (119) only serves public assets retrieved from OAS (101), it does not copy or have access to non-public data such as the contents of databases not publicly accessible but used by OAS (101). Due to this limitation, cloned site (119) only includes static content. That is, while the root path of OAS (101) may be generated by the OAS (101), the corresponding root path of cloned site (119) comprises a static web page.

This difference is notable when considering the ETV (123) and DTC (125) on a given web page (121) served by cloned site (119). While the ETV (105) and DTC (107) generated by OAS (101) are dynamic values, the ETV (123) and DTC (125) on cloned site remain static. Specifically, when the attacker (115) receives web page (103), it receives the values of the ETV (105) and DTC (107) that are unique to that request. Thus, when the attacker (115) clones the web page (121), the ETV (123) and DTC (125) will be the same as the ETV (105) and DTC (107) retrieved by the attacker and are not updated when the phished client (127) retrieves the web page (121).

In one embodiment, the DTC (125) is not unique for each request and operates regardless of the client. In this manner, the DTC (125) executed by the browser (129) of the client (127) (or the phishing detector (131)) can detect when the ETV (123) is invalid, thus signaling a phishing attempt. Details of the operation of the DTC (125) or phishing detector (131) are described later herein.

Finally, in one embodiment, the browser/crawler (117) of the attacker (115) may be configured to execute JavaScript or other code when crawling OAS (101). In these embodiments, the attacker (115) will—effectively—execute the phishing detector. Additionally, in some embodiments, the cloned site (119) and attacker (115) may comprise the same device (and thus may share an Internet Protocol (IP) address, among other data).

Figure 2:
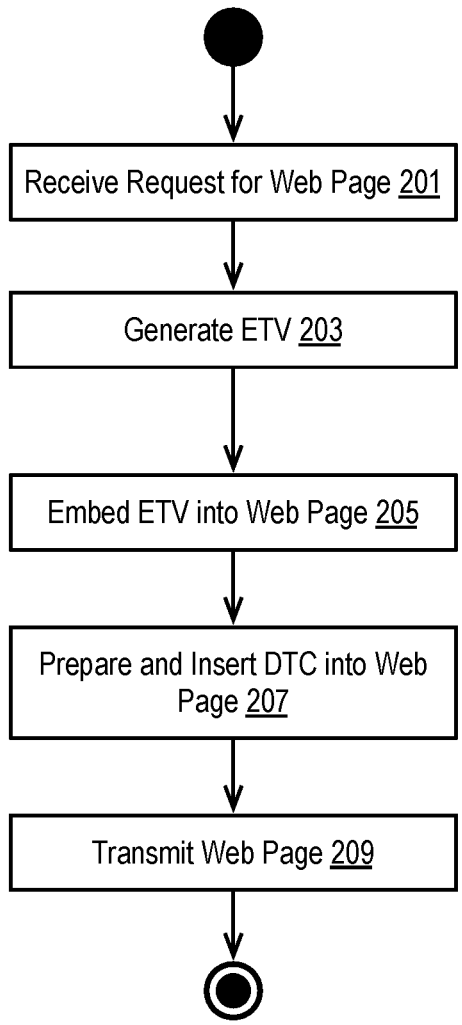
FIG. 2 is a flow diagram illustrating a method for modifying a webpage to include anti-phishing mechanisms according to some embodiments of the disclosure.

FIG. 2 is a flow diagram illustrating a method for modifying a webpage to include anti-phishing mechanisms according to some embodiments of the disclosure. In the illustrated embodiment, the method may be performed by a web server, application server, or other type of network computing device receiving requests from remote computing devices.

In step 201, the method receives a request for a webpage.

In one embodiment, the request for a webpage may comprise an HTTP or similar request following a defined network protocol. In one embodiment, the server is the aforementioned OAS. No limitations are placed on the specific form of the request, provided that the request include identifying information regarding the requestor (e.g., client device), discussed herein.

In step 203, the method generates an ETV. In one embodiment, the ETV comprises an encoded value that uniquely tags the request for a webpage.

Figure 3:
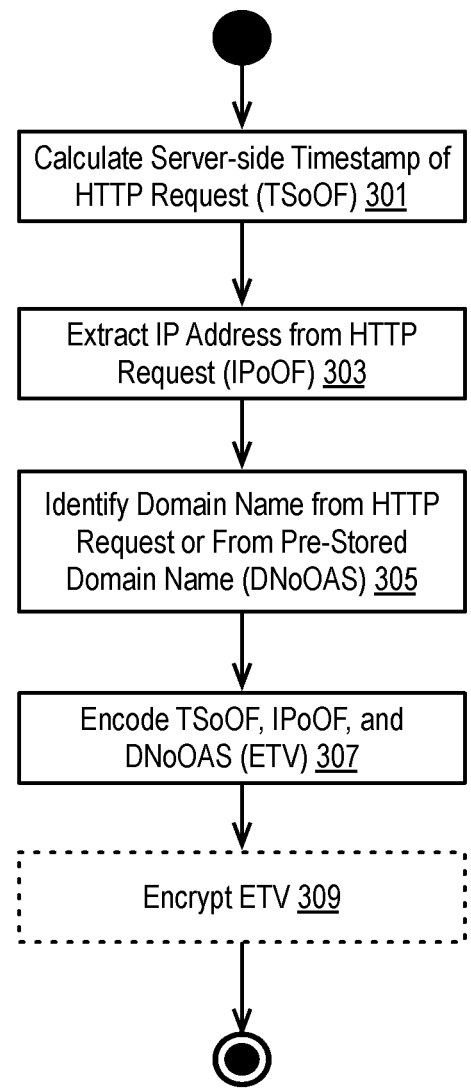
FIG. 3 illustrates a method for generating an ETV according to some embodiments of the disclosure.

FIG. 3 illustrates a method for generating an ETV according to some embodiments of the disclosure.

In step 301, the method calculates a server-side timestamp of an HTTP request. In one embodiment, the server receiving the request includes code that calculates a timestamp based on the time the HTTP request is received. In other embodiments, the timestamp may be sent along with the HTTP request as a header or parameter of the request. Due to clock drift, network latency and other factors, the subsequent use of the timestamp in validating the ETV may be considered (discussed later herein).

In step 303, the method extracts an IP address of the client sending the HTTP request. An HTTP request does not include the sender's IP address, rather that information is stored in the IP header. In some embodiments, the method may extract the IP address from the IP header encapsulated by the HTTP request. In other embodiments, the method may rely on a third-party library or programming environment (e.g., in the "request" object of Node.js's HTTP module).

In step 305, the method identifies a domain name to include in the ETV. In one embodiment, the domain name may be configured as a pre-stored constant accessed by the server implementing the method of FIG. 3. In another embodiment, the domain name may be extracted from the HTTP request itself (e.g., from the "Host" request field of the request).

In step 307, the method encodes the timestamp, IP, and domain name retrieved in steps 301, 303, and 305, respectively. In one embodiment, the method encodes each of the segments using a fixed encoding scheme (e.g., base-64). In other embodiments, the encoding may vary on a per-segment basis based on the subsequent insertion policy (for example, a timestamp may be encoded as an integer representing the UNIX epoch, the IP address may be converted to an integer, and the domain name may be base-64 encoded). In some embodiments, the segments are concatenated and encoded together.

In step 309, the method optionally encrypts the ETV. In one embodiment, the method encrypts the ETV using public-key cryptography. For example, the method may be encrypted the ETV using the public key of the client device and return the encrypted ETV to the client.

In step 205, the method inserts the ETV into the web page.

In one embodiment, as part of step 201, the method builds a web page using a template that includes static content and, in some embodiments, placeholders for dynamic content (e.g., usernames, date/time, etc.).

In one embodiment, the template may include an instruction where the ETV should be inserted (e.g., "<%=insert_etv %>" in a Ruby ERB template where the insert_etv method is provided by an external library and outputs a string value or value convertible to a string). In this scenario, a developer may place the ETV generation code in a global layout template or, alternatively, in individual templates to be rendered.

In alternative embodiments, the server itself may intercept webpages and insert the ETV into the webpage. As one example, the ETV insertion logic may be implemented as a middleware function of a web stack. For example:

```
//--snip--
function etv(req, res, next) {
//snip: insert ETV into res.body
next( );
}
function dtc(req, res, next) {
//snip: insert DTC into res.body
next( );
}
//--snip--
server.use(web.router);
server.use(etv);
server.use(dtc);
server.use(errorHandler);
//--snip--
server.listen(80);
```

Code Block 1

In the above example (a server implemented in Node.js), the "web.router" middleware is used to route HTTP requests to functions which, ultimately, set the response body of the HTTP response to comprise the generated template. The next middleware function (etv) receives the response body as a property of an input parameter (res) and modifies the body by inserting the ETV before returning the modified response body to the next middleware function (errorHandler).

Other techniques may be used to insert an ETV into a web page and the above examples are provided for the sake of clarity and should not limit the scope of the disclosure.

The specific method of how the ETV is inserted into a web page may take many forms, some of which are described herein.

In one embodiment, the ETV is inserted into the web page as a textual string in the content of the page. In this embodiment, a fixed delimiter (e.g., "ETV:") may be used to signal the beginning of the ETV. In a similar embodiment, the ETV may be included as an attribute of an existing or new tag. For example, an HTML META tag may be included such as <meta name="etv" content="ABCD12349 DC129857AEF">.

While the above solutions include the ETV within a web page, they potentially expose the ETV to an attacker in obvious ways. Thus, in some embodiments, the ETV may be further obfuscated to avoid detection. As used herein obfuscating can include concealing or obscuring the inserted ETV code in webpage or portion of the webpage provided to the requesting source.

In one embodiment, the ETV is inserted into another resource (e.g., a CSS file) such that the ETV is difficult to quickly identify by an attacked. In one embodiment, the ETV can be segmented into fixed length strings and each string encoded using a pre-defined encoding (e.g., converting to hex via base-16 encoding). The segments may then be stored as variables or other strings within the resource. For example, the segments of the ETV may be inserted as values associated with defined CSS parameters (e.g., "color:

123ABC"). When executing, the DTC is configured to retrieve the parameters and use the resulting values as the ETV segments.

For example, the ETV may comprise the string "1548188349348 187.100.100.100 retailer.com" representing a UNIX timestamp, IP address, and domain name. The base-16 comprising: "313534 383138 383334 393334 382031 38372E 313030 2E3130 302E31 303020 726574 61696C 65722E 636F6D" (separated by spaces for clarity). This encoding can then be inserted into a stylesheet as, for example:

p.notice-1={
color: #313534
position: fixed;
left: 0;
}
div.info ul li a.link-2 {
--custom-var: #383138;
display: inline-block;
}

In this embodiment, the DTC may store an ordered list of which selectors/properties to access or may use the property names themselves to order the selectors/properties. Then, the DTC can extract the property values and rebuild the base-16 string: e.g., "document.querySelector("p.notice-1") .style.getPropertyValue("color")."

As another example, properties of a JavaScript object (or objects) can be used to obfuscate the ETV segments. For example, the following objects may be used to obfuscate the ETV:

function Counter( ) {
this.currentVal=0;
this.MAX=1548188349348;
this.MIN=0;
this.increment=( )=>{this.currentVal++};
this.increment=( )=>{this.currentVal--};
}
function Slider(e) {
this.element=e;
this.timeDelayInMs=3143918692;
this.animate=( )=>{/*snip*/};
}
function Encryptor( ) {
this.salt="cmV0YWlsZXIuY29t";
this.encrypt=( )=>{/*snip*/};
}

In this embodiment, the same ETV ("1548188349348 187.100.100.100 retailer.com") is encoded into object properties (MAX, timeDelayInMs, and salt, respectively). In the example, the IP address was converted into octets and then to an integer representation and the domain is base-64 encoded to further obfuscate the ETV. The DTC can then access the object properties to rebuild the ETV:

function intToIP(int) {
var part1=int & 255;
var part2=((int>>8) & 255);
var part3=((int>>16) & 255);
var part4=((int>>24) & 255);
return part4+"."+part3+"."+part2+"."+part1;
}
const TS=(new Counter( )).MAX;
const IP=intToIP((new Slider( )).timeDelayInMs);
const DN=atob((new Encryptor( )).salt);
const ETV=`${TS} ${IP} ${DN}`

The precise way in which ETV segments are encoded in other resources is not limited to the above examples or the specific way in which the examples illustrate obfuscation. Rather, they are meant to exemplify techniques of obfuscating the ETV value by segmenting the value and placing the segments into portions of other resources where similarly structured strings appear (e.g., converting an IP address to an integer and using it as a spoofed "time" parameter or inserting a base-16 encoded string as a hexadecimal color value).

As another example, the ETV may be encoded into a uniform resource locator (URL) included in the web page. This technique may rely on a known operation of a DNS server. For example, the ETV may be included within a reference to a content delivery network (CDN):

Before:
 <script type="text/javascript"
 src="https://cdn.loudflare.com/scripts/library.js"></script>
After:
 <script type="text/javascript"
 src="https://ETV.cdn.loudflare.com/scripts/library.js"></script>

In this example, "ETV" refers to the encoded/encrypted ETV value. In this example, the DNS resolver may ignore all strings appearing before "cdn.loudflare.com" and thus the ETV may be encoded into the URL without impacting the regular operation of the script.

Similarly, the ETV may be included in URLs or query strings in assets external to the web page, such as CSS stylesheets:

@import url("http://ETV.assets.retailer.com/styles.css");
.topbanner {
background: url("http://ETV.assets.retailer.com/background.png")
}
@font-face {
font-family: "Open Sans";
src: url("/fonts/OpenSans-Regular-webfont.woff2?etv=ETV") format("woff2"),
url("/fonts/OpenSans-Regular-webfont.woff?etv=ETV") format("woff");
}

Here, as before "ETV" is replaced with the encoded ETV value.

As an alternative embodiment, if the ETV is encoded in the domain name of a URL, a further embodiment comprises modifying a DNS server to automatically process the ETV in lieu of processing the ETV using the DTC.

Specifically, if the ETV is included within the domain of a URL, the DNS server will receive a request to resolve the domain that includes the ETV. In this embodiment, the DNS server can be configured to detect the inclusion of the ETV. In this scenario, the DNS server can decode the ETV and extract the parameters to determine if the ETV is valid. As one test, the DNS server can compare the current time to the timestamp in the ETV to determine if the difference exceeds a time to live (TTL). The TTL may be present to a fixed time period. If the difference exceeds the TTL, the DNS server can notify the OAS that a phishing attempt is underway or has already occurred.

Additionally, the DNS server may resolve the requested domain to a separate asset server which will flag returned assets with messages indicating that the web page requesting the asset is not legitimate. For example, an OAS would request an image from a CDN and display the image at a location resolved by the DNS server. If the DNS server, however, detects that the request is fraudulent, it would resolve the DNS request to a separate server which modifies the assets to include, for example, a prominent label stating "WARNING: YOU ARE ACCESSING A CLONED SITE" or similar warning. When the client ultimately receives the image, it will be displayed in the usual fashion and thus display the warning to the user.

In an alternative embodiment, the ETV may be encoded into an asset itself. For example, the ETV can be embedded within an image associated with the web page. In this example, when an attacker clones the website (and images associated therewith), the ETV is included within the cloned assets and is difficult to detect and remove.

In one embodiment, the ETV can be included within Exchangeable Image File Format (EXIF) metadata associated with images. In this embodiment, the ETV segments should be included in EXIF fields that most closely resemble the format of the segments, or the segments should be encoded to match the contents of the EXIF field. For example, the timestamp can be inserted in the "DateTimeOriginal" field, the octets of the IP address can be encoded into the GPSInfo field, and a base-16 encoded version of the domain name can be spread across multiple int16 or int32 fields appearing in sequence (e.g., BitsPerSample, Compression, etc.). In some embodiments, the data included in the EXIF data is encrypted prior to insertion into the EXIF metadata. By ensuring that the ETV segments are included in similar-looking fields of EXIF data, the approach avoids detection by machine learning systems that attempt to identify anomalous EXIF data field values.

In some embodiments, an attacker may strip all EXIF data from images since the EXIF data is not displayed to the user. In this embodiment, the method may steganographically embed the ETV in assets such as images. Steganography can include inserting content within the images, audio clips, video, and other types of content themselves, not in metadata. In one embodiment, steganography is used to insert the ETV within an image to be decoded by either an automated program (e.g., the DTC) or by a human security professional.

Finally, in some embodiments, the method may encode the ETV into an existing asset using hidden characters. Specifically, in one embodiment, the method strips trailing white space from the lines of a given file and encodes the ETV using spaces inserted at the ends of lines (e.g., using binary or hexadecimal encodings). Thus, in one embodiment, spaces at the end of a line represent a binary or hexadecimal digit which is then used to decode the ETV. In some embodiments, the file encoding the ETV may comprise the DTC itself.

In one embodiment, multiple encoding mechanisms described above may be used simultaneously to guard against the failure of one single encoding.

In step 207, the method prepares and inserts the DTC into the web page.

In one embodiment, the template may include an instruction where the DTC should be inserted (e.g., "<%=insert_dtc %>" in a Ruby ERB template where the insert_dtc method is provided by an external library and manipulates a web page to include the DTC). In this scenario, a developer may place the DTC generation code in a global layout template or, alternatively, in individual templates to be rendered.

Alternatively, returning to Code Block 1, the DTC may be inserted via a middleware function (or similar code) that intercepts the response body prior to sending the response by to the client (via intermediate middleware). The specific operations of how middleware functions are provided above in the description of Code Block 1 and are not repeated herein.

In one embodiment, the method may simply insert the DTC code into the webpage at a fixed location (e.g., as an external SCRIPT tag at the end of an HTML document).

In some embodiments, the method may insert the DTC into multiple locations within the web page. However, in this embodiment, the method may prevent the DTC copies from interfering with one another. For example, in one embodiment, the copies of the DTC may include a prefix before any variable, function, or other identifier to prevent namespace collisions. In some embodiments, this prefix may comprise a mangled keyword of the underlying language (e.g., "var" may be used in a case-sensitive language that declares variables using "var"). Thus, if one copy of the DTC is detected, other copies may continue to execute. In other embodiments, all variable, function, class, or other identifiers may be randomly generated by the server prior to insertion, thus ensuring a unique DTC for each insertion point.

Like the ETV, other techniques may also be implemented in addition to (or in lieu) of the foregoing insertion policy. These techniques are described herein in more detail. The below techniques may be implemented individually or in combination with one another.

As one example, the DTC will generally include the identity of a tracking server (e.g., domain name) in order to transmit notifications. To obfuscate the intention of the DTC, this identifier can be encoded to avoid detection by text scraping. For example, an IP address can be used in lieu of the domain name. Alternatively, the domain name may be base-64 encoded to prevent easy detection.

As another example, the individual instructions can be interleaved with other code to avoid detection. For example, a web page may include multiple instructions from an unrelated library:

```
Vue.component('manage-posts', {
  template: '#manage-template',
  data: function( ) {
    return {
      posts: [/* . . . */]
    }
  }
})
Vue.component('create-post', {
  template: '#create-template'
})
new Vue({
  el: '#app',
  data: {
    currentView: 'manage-posts'
  }
})
```

Conversely, the DTC may include the following pseudo-instructions:

```
const etv=DTC.decodeETV( );
const result=DTC.isETVValid(etv);
DTC.sendNotification(result);
```

This DTC code may be interleaved within the existing code in locations that will not impact the operation of the existing code:

```
const etv=DTC.decodeETV( );
Vue.component('manage-posts', {
  template: '#manage-template',
  data: function( ) {
    return {
      posts: [/* . . . */]
    }
  }
})
const result=DTC.isETVValid(etv);
```

```
Vue.component('create-post', {
template: '#create-template'
})
DTC.sendNotification(result);
new Vue({
el: '#app',
data: {
   currentView: 'manage-posts'
}
})
```

As another example, the DTC may obfuscate access to document object model (DOM) elements that may indicate the purpose of the DTC. For example, in order to confirm whether the domain name is equal to the displayed webpage's domain name, the property window.location.hostname must be accessed as illustrated below:

```
const domainName=window.location.hostname;
const domainNameMatches=domainName===ETV.domainName;
```

However, including this source code may indicate to an attacker that the hostname is being confirmed. To avoid this, the property names may be spread out and obfuscated. In a first example, the "window" object can be obtained without using the text "window":

```
var discoveredglobal=Function('return this')( );
const domainName=discoveredglobal.location.hostname;
const domainNameMatches=domainName===ETV.domainName;
```

To further obfuscate the above code, the other text identifiers can be further obfuscated. For example, using the above "spreading" of code, the strings "location", "hostname" and other static property names can be assigned to innocuous variables in unrelated sections of code:

```
//--snip 45 lines of code--
var gv=Function('return this')( );
//--snip 124 lines of code-
const b='location';
//--snip 125 lines of code-
const c='host';
//--snip 25 lines of code-
const d='Name';
//--snip 120 lines of code-
const e='domain'
//--snip 2345 lines of code--
const f=gv[b][c+d.toLowerCase( )];
const g=d===ETV[e+d];
```

Here, the ultimate function of the DTC is unchanged, however the code is segmented into various innocuous variable declarations and the underlying language (JavaScript) features are leveraged to access properties via bracket notation (versus dot notation).

In step 209, the method transmits the web page (including the ETV and DTC) back to the client device. In response, the client loads the web page and executes the DTC to decode the ETV as will be described herein.

Figure 4:
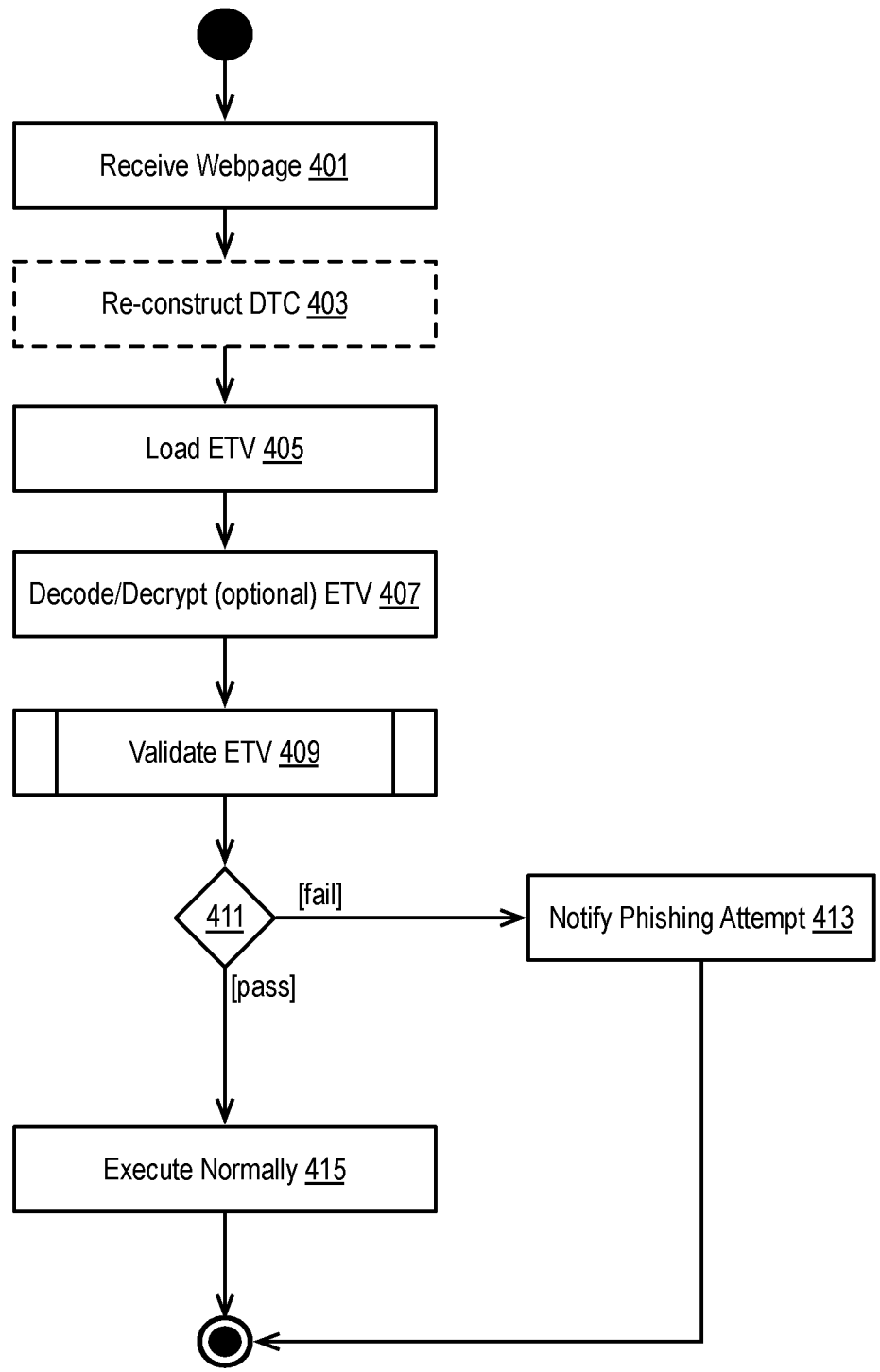
FIG. 4 is a flow diagram illustrating a method for detecting a phishing attempt according to some embodiments of the disclosure.

FIG. 4 is a flow diagram illustrating a method for detecting a phishing attempt according to some embodiments of the disclosure.

In step 401, the method receives a web page. As described, above a client device receives a web page including HTML, JavaScript, CSS, and other assets including the ETV and DTC (either directly or by reference).

In step 403, the method re-constructs the DTC. The specifics of deconstructing and re-constructing are described above in connection with step 207. As described therein, the DTC comprises executable code that may or may not be segmented, encoded, and otherwise obfuscated in the web page or in an external resource. In step 403, the method reconstructs the DTC by reversing the encoding procedure employed in step 207. As illustrated, step 403 may be optional in the embodiment where the DTC is included as a regular asset and is not encoded or obfuscated by segmentation.

In step 405, the method loads the ETV. As in step 403, various techniques for obfuscating the ETV are described in connection with steps 203 and 205. In step 405, the method reverses these steps to re-construct an ETV that has been segmented and encoded in multiple locations.

In step 407, the method decodes and (optional) decrypts the ETV. As described above, the segments of the ETV may be encoded (e.g., using base-64) and, in some embodiments, encrypted using the client devices public key. In step 407, the method decodes and decrypts these segments to obtain a cleartext ETV corresponding to the ETV generated in FIG. 3.

In step 409, the method validates the ETV. Details of validation are provided in FIG. 5. In general, validating the ETV comprises performing multiple comparisons to confirm that the ETV was validly generated.

In step 411, the method determines if the validation passes or fails.

In step 413, the method notifies a tracking server of a phishing attempt if the validation fails.

In the illustrated embodiment, notifying a tracking server comprises issuing an HTTP request to a tracking server identified in the DTC which flags the ETV as fraudulent. In one embodiment, the method transmits the domain name of the server that returned the phished web page in order to identify the cloned site. In one embodiment, the tracking server can be notified by inserting a 1×1 pixel into the DOM of the web page, triggering a network request. In other embodiments, the DTC may proactively issue an Asynchronous JavaScript and XML (AJAX) request to the tracking server. In either embodiment, or others, the ETV may be included in the URL used to issue the request (i.e., the URL of the tracking server may include the ETV, current domain name, and/or cloned site IP address as, for example, query string parameters). In some embodiments, the method may further transmit the client's IP address. In one embodiment, the tracking server can identify where the phishing site is being served from using the received domain name of the cloned site and the IP address of the cloned site. Further, by recording the timestamps in the ETV, the system can identify the earliest recorded timestamp as the attacker. Alternatively, or in conjunction with the foregoing, the tracking server can resolve the IP address of the domain and compare that IP address to the client device IP address to identify the attacker.

Alternatively, or in conjunction with the foregoing, the method may further take additional action after notifying the tracking server. For example, the method may alert the user (via JavaScript or via native functionality) that the current site is a phishing site. The method may additionally block all future connections to the domain or to the domain's IP address.

In some embodiments, once the method determines that a third-party is serving a cloned copy of the OAS, the method may further transmit a notification to a third-party authority, or may record the identity of the cloned server, for future use. In some embodiments, the recordation of the identity of the cloned server can be stored with a threat intelligence database or feed of malicious or phishing sites. As one example, this recordation can be used by, for example, web browsers to identify malicious sites. As another example, search engines may use this recordation to filter search results, preventing the display of links to malicious sites on search engine results pages.

In some embodiments, described more fully in connection with step 511, the method may further obtain source information of the initial attacker cloning an OAS. In this embodiment, the method can record the identity of the attacking device and/or other properties of the attacking device. This record may be stored in a threat intelligence database or feed of malicious client attributes and be used during future requests to block access to websites that originate with known malicious clients. For example, the IP address, browser fingerprint, or other identifying information can be stored in a list of malicious actors. Websites can then use the list or feed to validate incoming requests and flag requests matching the list of malicious client devices.

In step 415, the method executes the web page normally. In one embodiment, the method may issue a network request similar to that in step 413, however the request may indicate that the ETV validation passed.

Figure 5:
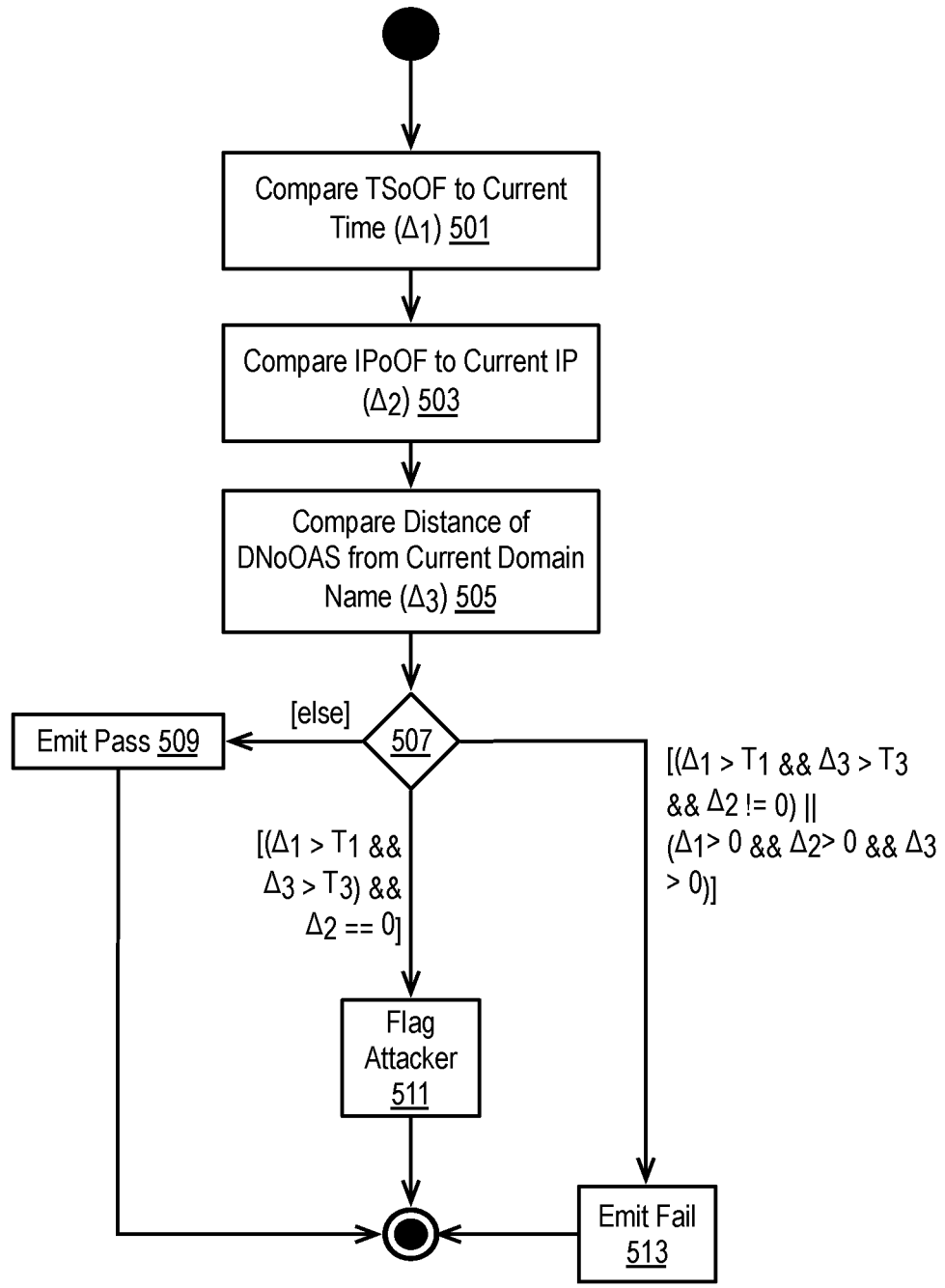
FIG. 5 is a flow diagram illustrating a method for validating an ETV according to some embodiments of the disclosure.

FIG. 5 is a flow diagram illustrating a method for validating an ETV according to some embodiments of the disclosure.

In step 501, the method compares the ETV timestamp (TSoOF) to the current time, computing the value $\Delta 1$. In one embodiment, both timestamps are represented as integers (e.g., UNIX time) and thus $\Delta 1$ can be computed by subtracting the TSoOF from the current timestamp and taking the absolute value of the result.

In step 503, the method compares the IP address in the ETV (IPoOF) to the IP address of the current web site, computing the value $\Delta 2$. In one embodiment, the value of $\Delta 2$ comprises a Boolean value representing whether the IPoOF and current IP are equal.

In step 505, the distance between the domain name in the ETV and the current web page's domain name, computing the value $\Delta 3$. In one embodiment, $\Delta 3$ represents a distance between the characters of the two domain names. For example, $\Delta 3$ may comprise the Levenshtein distance between the two values.

In step 507, the method computes various comparisons between the three computed values.

Specifically, if $\Delta 1$ is greater than a specific distance $T_1$ and the value of $\Delta 3$ is greater than a specific distance $T_3$ the validation fails. Alternatively, if all values of $\Delta 1$, $\Delta 2$ and $\Delta 3$ are greater than zero (i.e., they all do not match), the validation fails. In the first condition, the threshold $T_1$ be set to avoid clock skew or incorrect time/date settings causing false positives (e.g., $T_1$ may be set to 10 to 15 seconds). Further, $T_3$ may be set to account for varying subdomains such that "www.retailer.com" and "www1.retailer.com" to not trigger validation failures. Thus, in the first prong $\Delta 1$ and $\Delta 3$ must be more than slightly different than the current time and current domain name, respectively. Alternatively, in the second prong, the thresholds are not used and if all values are incorrect, the validation fails.

If either of the validations fail, the method emits a fail signal (513) and the method proceeds to notify a tracking server, as described in FIG. 4. In contrast, if the validations pass, the method emits a pass signal (509) and the method illustrated in FIG. 4 continues appropriately.

Illustrated in FIG. 5, is an additional validation wherein the current IP is equal to the IP address in the ETV while $\Delta 1$ and $\Delta 3$ both exceed their respective thresholds. In this case, the IP address is likely the attacker's IP address. Thus, in step 511, the method does not emit pass for fail and rather, flags the attacker to avoid detection of the tracking code.

Figure 6:
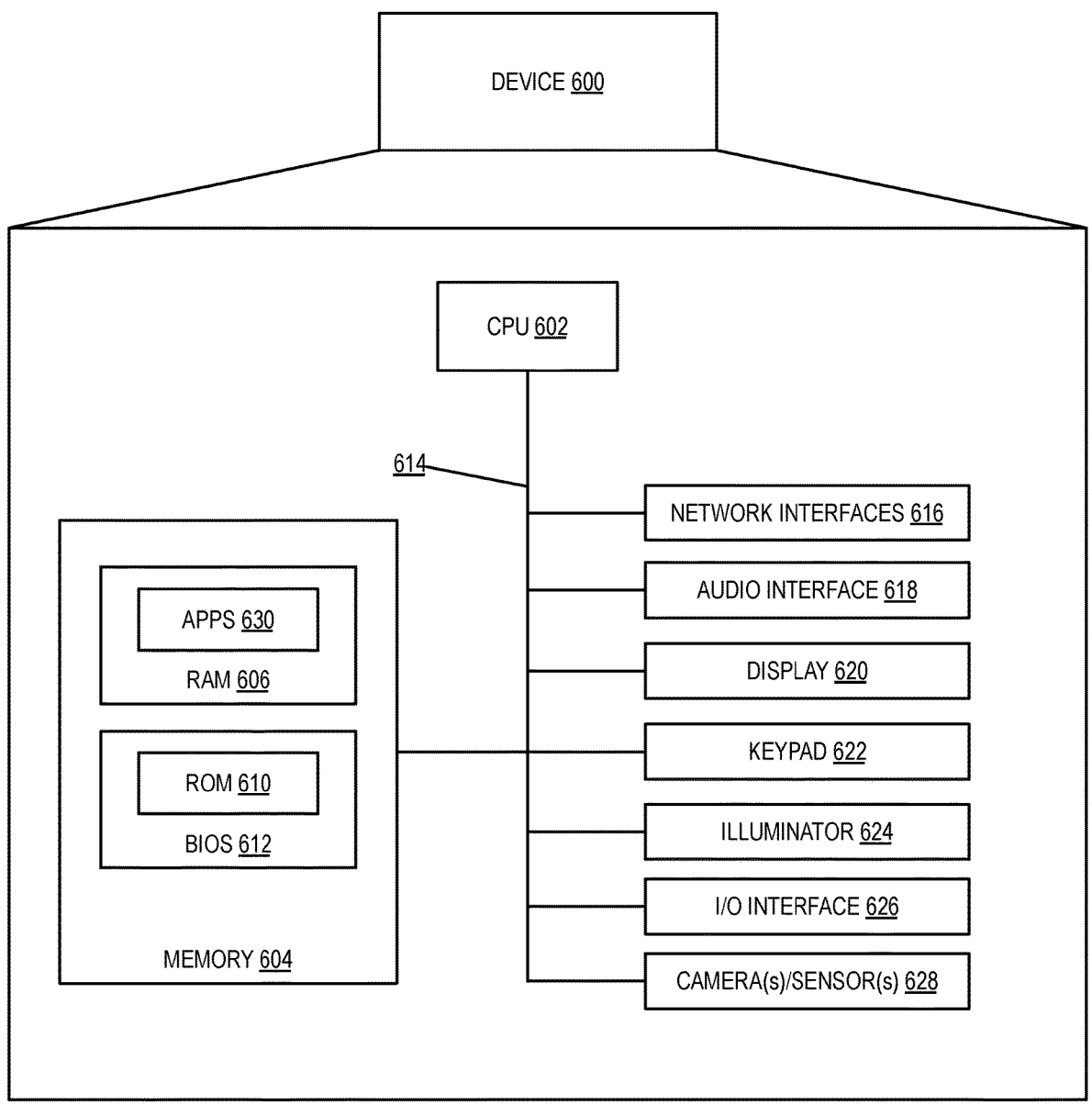
FIG. 6 is a block diagram of a computing device according to some embodiments of the disclosure.

FIG. 6 is a block diagram of a computing device according to some embodiments of the disclosure.

Processing device can include many more or fewer components than those shown in FIG. 6. For example, the aforementioned instances may not require an audio interface, display, keypad, illuminator, or cameras/sensors. However, the components shown are sufficient to disclose an illustrative embodiment for implementing the present disclosure. Further, in some embodiments, the device illustrated in FIG. 6 can be implemented as a virtual machine while in other embodiments the device can be implemented as a physical machine. In some embodiments, the device is implemented as both, with a virtual machine running on the device depicted in FIG. 6.

As shown in FIG. 6, device (600) includes processing units (CPUs) (602) in communication with a mass memory (604) via a bus (614). Device (600) also includes one or more network interfaces (616), an audio interface (618), a display (620), a keypad (622), an illuminator (624), an input/output interface (626), and a camera(s) or other optical, thermal or electromagnetic sensors (628). Device (600) can include one camera/sensor (628), or a plurality of cameras/sensors (628), as understood by those of skill in the art.

Device (600) can optionally communicate with a base station (not shown), or directly with another computing device. Network interface (616) includes circuitry for coupling device (600) to one or more networks and is constructed for use with one or more communication protocols and technologies. Network interface (616) is sometimes known as a transceiver, transceiving device, or network interface card (NIC).

Audio interface (618) is arranged to produce and receive audio signals such as the sound of a human voice. For example, audio interface (618) can be coupled to a speaker and microphone (not shown) to enable telecommunication with others and generate an audio acknowledgment for some action. Display (620) can be a liquid crystal display (LCD), gas plasma, light emitting diode (LED), or any other type of display used with a computing device. Display (620) can also include a touch sensitive screen arranged to receive input from an object such as a stylus or a digit from a human hand.

Keypad (622) can comprise any input device arranged to receive input from a user. For example, keypad (622) can include a push button numeric dial, or a keyboard. Keypad (622) can also include command buttons that are associated with selecting and sending images. Illuminator (624) can provide a status indication and provide light. Illuminator (624) can remain active for specific periods of time or in response to events. For example, when illuminator (624) is active, it can backlight the buttons on keypad (622) and stay on while the device (600) is powered. Also, illuminator (624) can backlight these buttons in various patterns when actions are performed, such as dialing another processing device. Illuminator (624) can also cause light sources positioned within a transparent or translucent case of the device (600) to illuminate in response to actions.

Device (600) also comprises input/output interface (626) for communicating with external devices not shown in FIG. 6. Input/output interface (626) can utilize one or more communication technologies, such as USB, infrared, Bluetooth™, or the like.

Mass memory (604) includes a RAM (606), a ROM (610), and other storage means. Mass memory (604) illustrates another example of computer storage media for storage of information such as computer-readable instructions, data structures, program modules or other data. Mass memory (604) stores a basic input/output system ("BIOS") (612) for controlling low-level operation of processing device (600). The mass memory can also store an operating system for controlling the operation of processing device (600). It will be appreciated that this component can include a general-purpose operating system such as a version of UNIX, or LINUX™, or a specialized client communication operating system such as Windows Client™, or the Symbian® operating system. The operating system can include, or interface with a Java virtual machine module that enables control of hardware components and operating system operations via Java application programs. Memory (604) includes one or more software applications (630) for implementing some or all of the methods described above.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, at a server, a request for a webpage from a client device;
   generating, at the server, an encoded tracking value (ETV) by encoding a value corresponding to at least one property extracted from the request;
   inserting, by the server, the ETV into the webpage, the inserting the ETV comprising:
      segmenting the ETV into multiple pieces,
      encoding each of the multiple pieces, and
      assigning each of the encoded pieces to different property values of an asset referenced by the webpage;
   inserting, by the server, dynamic tracking code (DTC) into the webpage, the inserting of the DTC further comprising obfuscating the DTC; and
   returning, by the server, the webpage including the ETV and DTC to the client device, the DTC configured to execute upon receipt at the client device and reconstruct and validate the generated ETV using the multiple pieces upon executing.

2. The method of claim 1, the value corresponding to at least one property comprising a value selected from the group consisting of a timestamp when the request is received, an Internet Protocol (IP) address of the client device, and a domain name of the server.

3. The method of claim 1, the obfuscating the DTC comprising one or more of:
   encoding all references to the server in the DTC,
   interleaving instructions of the DTC among the instructions of existing code in the webpage or in files referenced by the webpage,
   encoding any references to document object model (DOM) elements referenced in the DTC,
   placing the DTC in more than one form in more than one place in the webpage, or
   obscuring a name of the server.

4. The method of claim 1, the DTC further including a time to live (TTL) and the validating the ETV upon executing comprising determining if the TTL has expired and, if so, validating the ETV.

5. The method of claim 1, the inserting the ETV comprising including the ETV in a uniform resource locator (URL) of a reference included in the webpage.

6. The method of claim 1, the inserting the ETV comprising steganographically embedding the ETV into one or more media assets referenced in the webpage.

7. A non-transitory computer readable storage medium for tangibly storing computer program instructions capable of being executed by a computer processor executing on a server, the computer program instructions defining the steps of:
   receiving a request for a webpage from a client device;
   generating an encoded tracking value (ETV) by encoding a value corresponding to at least one property extracted from the request;
   inserting the ETV into the webpage, the inserting the ETV comprising:
      segmenting the ETV into multiple pieces,
      encoding each of the multiple pieces, and
      assigning each of the encoded pieces to different property values of an asset referenced by the webpage;
   inserting dynamic tracking code (DTC) into the webpage, the inserting of the DTC further comprising obfuscating the DTC; and
   returning the webpage including the ETV and DTC to the client device, the DTC configured to execute upon receipt at the client device and reconstruct and validate the generated ETV using the multiple pieces upon executing.

8. The non-transitory computer readable storage medium of claim 7, the value corresponding to at least one property comprising a value selected from the group consisting of a timestamp when the request is received, an Internet Protocol (IP) address of the client device, and a domain name of the server.

9. The non-transitory computer readable storage medium of claim 7, the obfuscating the DTC comprising one or more of:
   encoding all references to the server in the DTC,
   interleaving instructions of the DTC among the instructions of existing code in the webpage or in files referenced by the webpage,
   encoding any references to document object model (DOM) elements referenced in the DTC,
   placing the DTC in more than one form in more than one place in the webpage, or
   obscuring a name of the server.

10. The non-transitory computer readable storage medium of claim 7, the DTC further including a time to live (TTL) and the validating the ETV upon executing comprising determining if the TTL has expired and, if so, validating the ETV.

11. The non-transitory computer readable storage medium of claim 7, the inserting the ETV comprising including the ETV in a uniform resource locator (URL) of a reference included in the webpage.

12. The non-transitory computer readable storage medium of claim 7, the inserting the ETV comprising steganographically embedding the ETV into one or more media assets referenced in the webpage.

13. A server comprising:
a processor;
a storage medium for tangibly storing thereon program logic for execution by the processor, the stored program logic comprising logic performing the steps of:
receiving a request for a webpage from a client device,
generating, at the server, an encoded tracking value (ETV) by encoding a value corresponding to at least one property extracted from the request,
inserting the ETV into the webpage, the inserting the ETV comprising:
 segmenting the ETV into multiple pieces,
 encoding each of the multiple pieces, and
 assigning each of the encoded pieces to different property values of an asset referenced by the webpage,
inserting dynamic tracking code (DTC) into the webpage, the inserting of the DTC further comprising obfuscating the DTC, and
returning the webpage including the ETV and DTC to the client device, the DTC configured to execute upon receipt at the client device and reconstruct and validate the generated ETV using the multiple pieces upon executing.

14. The server of claim 13, the value corresponding to at least one property comprising a value selected from the group consisting of a timestamp when the request is received, an Internet Protocol (IP) address of the client device, and a domain name of the server.

15. The server of claim 13, the obfuscating the DTC comprising one or more of:
 encoding all references to the server in the DTC,
 interleaving instructions of the DTC among the instructions of existing code in the webpage or in files referenced by the webpage,
 encoding any references to document object model (DOM) elements referenced in the DTC,
 placing the DTC in more than one form in more than one place in the webpage, or
 obscuring a name of the server.

16. The server of claim 13, the inserting the ETV comprising including the ETV in a uniform resource locator (URL) of a reference included in the webpage.

17. The server of claim 13, the inserting the ETV comprising steganographically embedding the ETV into one or more media assets referenced in the webpage.

* * * * *